(12) United States Patent
Janakiraman et al.

(10) Patent No.: US 9,065,701 B2
(45) Date of Patent: Jun. 23, 2015

(54) ENHANCED SERIALIZATION MECHANISM

(71) Applicant: Aruba Networks, Inc., Sunnyvale, CA (US)

(72) Inventors: Ramsundar Janakiraman, Sunnyvale, CA (US); Prasad Palkar, Sunnyvale, CA (US); Brijesh Nambiar, Sunnyvale, CA (US); Ravinder Verma, San Jose, CA (US); Rajesh Mirukula, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 71 days.

(21) Appl. No.: 13/928,300

(22) Filed: Jun. 26, 2013

(65) Prior Publication Data

US 2014/0157365 A1     Jun. 5, 2014

Related U.S. Application Data

(60) Provisional application No. 61/732,829, filed on Dec. 3, 2012.

(51) Int. Cl.
| | |
|---|---|
| *H04L 12/953* | (2013.01) |
| *H04L 29/06* | (2006.01) |
| *H04L 12/801* | (2013.01) |
| *H04L 12/745* | (2013.01) |
| *H04L 12/773* | (2013.01) |
| *H04L 12/841* | (2013.01) |

(Continued)

(52) U.S. Cl.
CPC .......... *H04L 29/06217* (2013.01); *H04L 47/11* (2013.01); *H04L 45/748* (2013.01); *H04L 45/60* (2013.01); *H04L 63/20* (2013.01); *H04L 47/122* (2013.01); *H04L 47/28* (2013.01); *H04L 63/0272* (2013.01); *H04L 63/101* (2013.01)

(58) Field of Classification Search
CPC .............................. H04L 1/1642; H04L 47/34
See application file for complete search history.

(56) References Cited

U.S. PATENT DOCUMENTS 6,728,265 B1 *  4/2004  Yavatkar et al. .............. 370/468
7,624,263 B1 * 11/2009  Viswanath et al. ........... 713/151

(Continued)

FOREIGN PATENT DOCUMENTS

WO    WO 2011019372 A2 *  2/2011

OTHER PUBLICATIONS

Non-Final Office Action in U.S. Appl. No. 13/918,748 dated Jan. 2, 2015. 13 pages.

(Continued)

*Primary Examiner* — Venkat Perungavoor
(74) *Attorney, Agent, or Firm* — Ying Wang (57) ABSTRACT

The present disclosure discloses a method and network device for an enhanced serialization mechanism. Specifically, the disclosed system receives a plurality of packets from a plurality of transport layer flows corresponding to a security association. Also, the system designates one processor of a plurality of processors to be associated with the security association. Moreover, the system assigns a sequence number to each packet, and transmits the plurality of packets from the plurality of transport layer flows such that packets within the same transport layer flow are transmitted in order of their sequence numbers. However, at least two packets from two different transport layer flows may be transmitted out of incremental order of their sequence number.

19 Claims, 9 Drawing Sheets

(51) Int. Cl.
*H04L 12/891* (2013.01)
*H04L 12/803* (2013.01)

(56) References Cited

U.S. PATENT DOCUMENTS

| | | | |
|---|---|---|---|
| 2004/0205332 A1* | 10/2004 | Bouchard et al. | 713/153 |
| 2005/0105524 A1 | 5/2005 | Stevens et al. | |
| 2008/0095167 A1* | 4/2008 | Bruss | 370/394 |
| 2010/0037311 A1 | 2/2010 | He et al. | |
| 2010/0172356 A1* | 7/2010 | Tavares et al. | 370/394 |
| 2011/0258444 A1* | 10/2011 | Chayat | 713/168 |
| 2011/0292945 A1* | 12/2011 | Yasuda | 370/394 |
| 2012/0057599 A1 | 3/2012 | Yong | |
| 2013/0246619 A1 | 9/2013 | Raja et al. | |
| 2013/0286846 A1 | 10/2013 | Atlas et al. | |

OTHER PUBLICATIONS

Non-Final Office Action in U.S. Appl. No. 13/692,622 dated Sep. 30, 2014. 5 pages.

* cited by examiner

ENHANCED SERIALIZATION MECHANISM

RELATED APPLICATIONS

This application claims the benefit of priority on U.S. Provisional Patent Application 61/732,829 filed Dec. 3, 2012 the entire contents of which are incorporated by reference.

Related patent applications to the subject application include the following: (1) U.S. Patent Application entitled "System and Method for Achieving Enhanced Performance with Multiple Networking Central Processing Unit (CPU) Cores" by Janakiraman, et al., U.S. application Ser. No. 13/692,622 filed Dec. 3, 2012; (2) U.S. Patent Application entitled "Ingress Traffic Classification and Prioritization with Dynamic Load Balancing" by Janakiraman, et al., U.S. application Ser. No. 13/692,608 filed Dec. 3, 2012; (3) U.S. Patent Application entitled "Method and System for Maintaining Derived Data Sets" by Gopalasetty, et al., U.S. application Ser. No. 13/692,920 filed Dec. 3, 2012; (4) U.S. Patent Application entitled "System and Method for Message handling in a Network Device" by Palkar, et al., U.S. application Ser. No. 13/918,732 filed Jun. 14, 2013 (5) U.S. Patent Application entitled "Session-Based Forwarding" by Janakiraman, et al., U.S. application Ser. No. 13/918,748 filed Jun. 14, 2013 (6) U.S. Patent Application entitled "Rate Limiting Mechanism Based on Device Load/Capacity or Traffic Content" by Nambiar, et al., U.S. application Ser. No. 13/918,760 filed Jun. 14, 2013; (7) U.S. Patent Application entitled "Control Plane Protection for Various Tables Using Storm Prevention Entries" by Janakiraman, et al., U.S. patent application Ser. No. 13/918,770 filed Jun. 14, 2013. The entire contents of the above applications are incorporated herein by reference.

FIELD

The present disclosure relates to networking processing performance of a symmetric multiprocessing (SMP) network architecture. In particular, the present disclosure relates to a system and method for an enhanced serialization mechanism.

BACKGROUND

A symmetric multiprocessing (SMP) architecture generally is a multiprocessor computer architecture where two or more identical processors can connect to a single shared main memory. In the case of multi-core processors, the SMP architecture can apply to the CPU cores.

In an SMP architecture, multiple networking CPUs or CPU cores can receive and transmit network traffic. Generally, network packets are received by NAE are passed to Packet ordering engine (POE). POE in SMP system not only helps control the order in which the packets are transmitted out from the system, but also helps control the order in which the packets are processed within the system.

Typically, to perform load balancing, the system will process a packet on a first-come first-serve round robin fashion. Thus, when the POE receives one or more packets from the NAE, before sending the packets to the CPU core for processing, the POE will set the order of the packets according when each packet is received by POE. When POE receives processed packets from the CPU core, POE will order the packets according to their set order. Thus, POE will send out processed packets in exactly the same order as those packets are received.

In addition, a conventional POE also allows for grouping packets from multiple flows by their corresponding flow identifiers. Thus, the POE can map a particular L4 flow to a POE flow. A POE flow generally represents a queue. For example, a POE may support 64K queues and 64K slots. A slot generally refers to a buffer or a packet descriptor. On the other hand, while ordering received packets, the POE can parse a packet, and classify it as either a L3 or L4 flow, and then map the packet to a queue in the POE based on the flow ID associated with the packet. Specifically, the POE can extract a key from a received packet, and configure a hashing algorithm which can be indexed to a range of flow identifiers. Therefore, essentially, the POE can map a packet to a flow. When the packet arrives at the CPU processing core, the packet will include information about both its flow identifier and its the packet descriptors. Note that, it is possible for the POE to use 64K queues with each queue corresponding to a slot. Also, the POE may use one queue that uses all of the 64K slots. Alternatively, the system may determine which ingress CPU, which a received packet will be sent to, based on the flow key without the use of the POE.

In a system where packets from the same flow are always sent to the same CPU core for processing, the proper ordering of packets within the same transport layer flow is guaranteed. However, it is difficult to guarantee correct ordering of packets from multiple transport layer flows, because these packets may be forwarded to different CPU cores for processing and thus may experience various amount of delay, which results in the packets to be transmitted out of the system out of order.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to SMP architecture performance enhancement, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to networking processing performance. In particular, the present disclosure relates to a system and method for enhanced serialization. Specifically, the system achieves enhanced serialization by receiving a plurality of packets from a plurality of transport layer flows corresponding to a security association. Also, the system designates one processor of a plurality of processors to be associated with the security association. Moreover, the system assigns a sequence number to each packet, and transmits the plurality of packets from the plurality of transport layer flows such that packets within the same transport layer flow are transmitted in order of their sequence numbers. However, at least two packets from two different transport layer flows may be transmitted out of incremental order of their sequence number.

General Architecture

Figure 1:
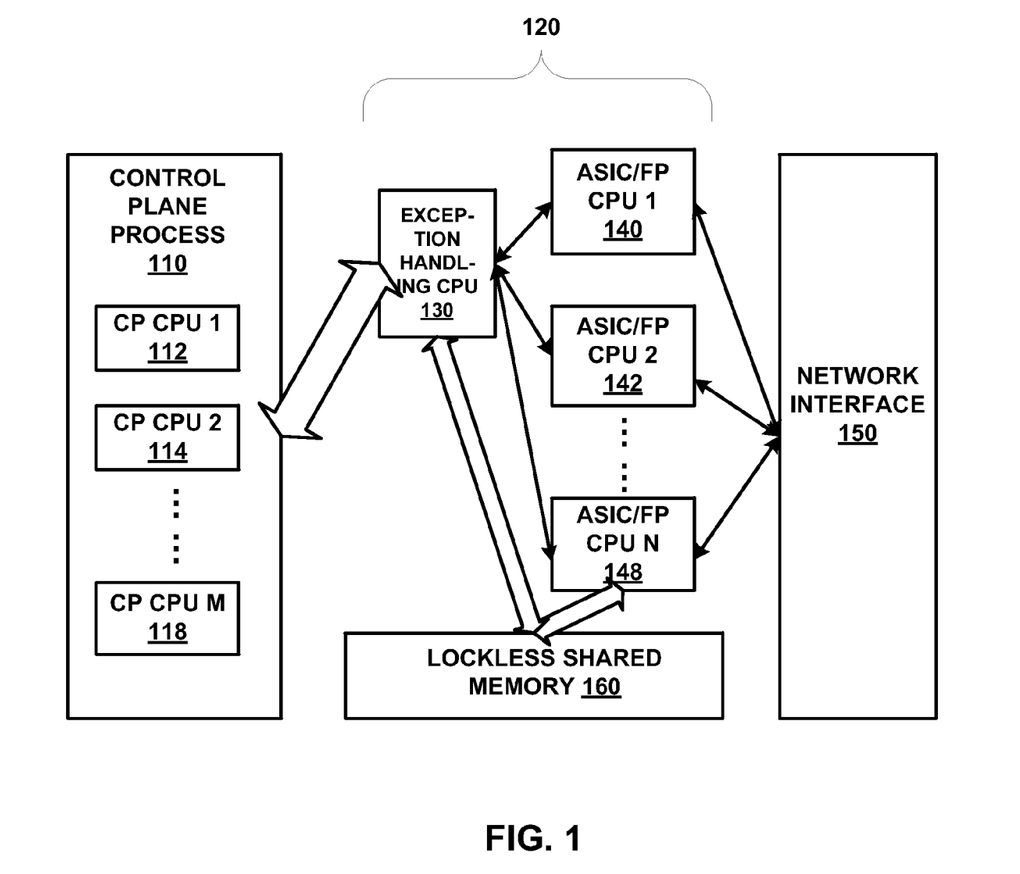
FIG. 1 illustrates an exemplary architecture at multiple processing planes according to embodiments of the present disclosure.

FIG. 1 illustrates a general architecture including multiple processing planes according to embodiments of the present disclosure. The disclosed system includes a plurality of control place processors (e.g., CP CPU1, CP CPU2, CP CPU 3, . . . CP CPU M) and a plurality of datapath processors, which include a slowpath (SP) or exception handling processor (e.g., SP CPU) and multiple fastpath (FP) or forwarding processors (e.g., FP CPU 1, FP CPU 2 . . . FP CPU N). In some embodiments, the FP processors can be replaced by multiple ASICs. The SP or exception handling processor can be a part of data plane processors or a separate CPU complex. Further, the SP or exception handling processor has the ability to program tables that are readable by the FP processors or ASICs. The disclosed system also includes a lockless shared memory that can be accessed by all datapath processors in the system.

Specifically, FIG. 1 includes at least a control plane process 110, two or more datapath processors 120, a lockless shared memory 160 accessible by the two or more datapath processors 120, and a network interface 150.

Control plane process 210 may be running on one or more CPU or CPU cores, such as CP CPU 1 112, CP CPU 2 114, . . . CP CPU M 118. Furthermore, control plane process 110 typically handles network control or management traffic generated by and/or terminated at network devices as opposed to data traffic generated and/or terminated at client devices.

According to embodiments of the present disclosure, datapath processors 120 include a single exception handling CPU 130, such as a slowpath (SP) processor and multiple fastpath (FP) processors or ASICs (e.g., ASIC/FP CPU 1 140, ASIC/FP CPU 2 142, . . . ASIC/FP CPU N 148). Only ASIC/FP processors are able to receive data packets directly from network interface 150. Exception handling processor, on the other hand, only receives data packets from ASIC/FP processors.

Lockless shared memory 160 is a flat structure that is shared by all datapath processors 120, and not tied to any particular CPU or CPUs. Any datapath processor can read any memory location within lockless shared memory 160. Therefore, both the single exception handling processor 130 and the multiple ASIC/FP processors (e.g., ASIC/FP CPU 1 140, ASIC/FP CPU 2 142, . . . ASIC/FP CPU N 148) have read access to lockless shared memory 160, but, besides write access to update timestamps by the multiple ASIC/FP processors, only the single exception handling processor 130 has write access to lockless shared memory 160. More specifically, any datapath processor can have access to any location in lockless shared memory 160 in the disclosed system.

Also, control plane process 110 is communicatively coupled to exception handling CPU 130, but not ASIC or fastpath (FP) processors (e.g., ASIC/FP CPU 1 140, ASIC/FP CPU 2 142, . . . ASIC/FP CPU N 148). Thus, whenever control plane process 110 needs information from datapath processors 120, control plane process 110 will communicate with exception handling processor 130.

Network Forwarding Pipeline Process

Figure 2:
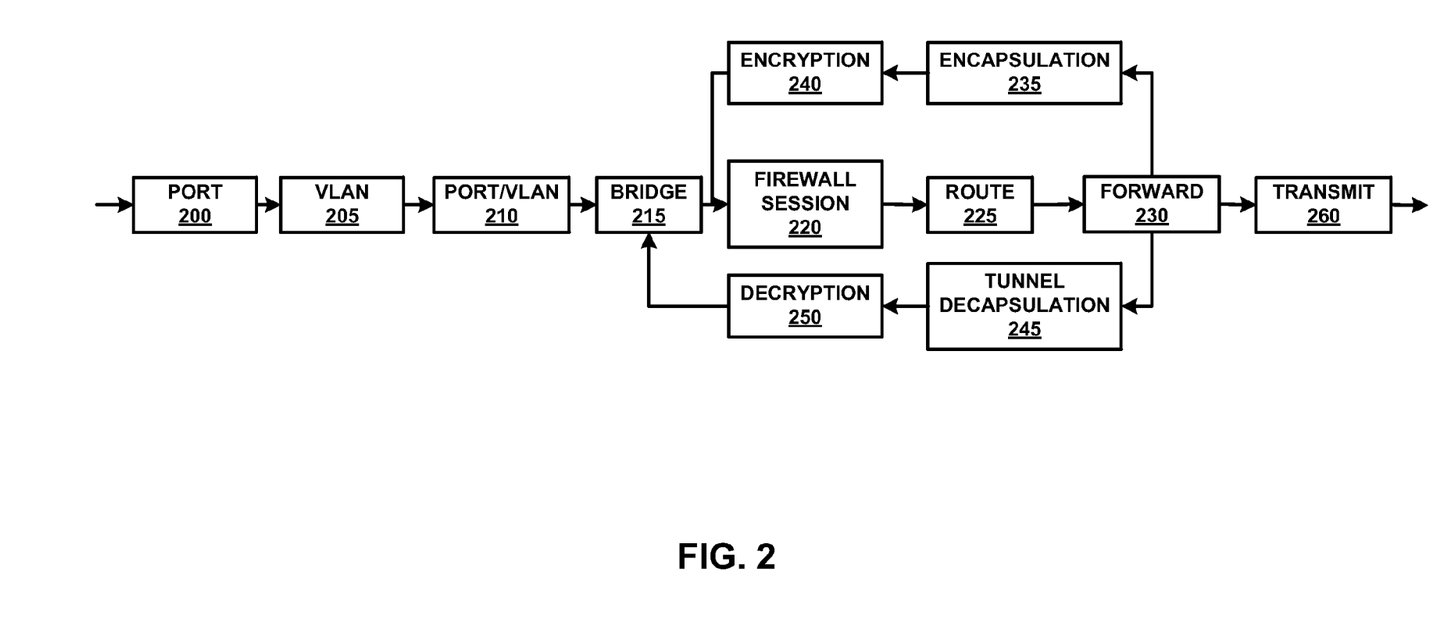
FIG. 2 illustrates an exemplary network forwarding pipeline process according to embodiments of the present disclosure.

FIG. 2 illustrates an exemplary network forwarding pipeline process according to embodiments of the present disclosure. A typical network forwarding pipeline process at a FP processor involves one or more of the following operations:

Port lookup;
VLAN lookup;
Port-VLAN table lookup;
Bridge table lookup;
Firewall session table lookup;
Route table lookup;
Packet encapsulation;
Packet encryption;
Packet decryption;
Tunnel de-capsulation; and/or
Forwarding; etc.

In a typical FP processor's pipeline process as illustrated in FIG. 2, for each ingress packet, the packet will pass through one or more of the following processing steps: a port lookup, a VLAN lookup, a port/VLAN lookup, a bridge lookup, a firewall session lookup, a route table or route cache lookup, forwarding table lookup, etc. In some embodiments, before the packet is transmitted, the packet will go through encapsulation and/or encryption process. If it's a L2 packet, the packet will go through bridge table lookup after encryption and continue with the process flow. On the other hand, if it's a L3 packet, the packet will go through firewall session lookup and continue with the process flow. In some embodiments, for example when an ingress packet is received via a GRE tunnel, the packet will go through a tunnel de-capsulation and/or decryption process. If it's a L2 packet, the packet will go through bridge table lookup after encryption and continue with the process flow. Note that, the L2 packets will be going through steps such as firewall session processing because the disclosed system is capable of performing L3/L4 policy enforcement, Deep Packet Inspection (DPI), etc., for even L2 bridge traffic.

Thus, the network forwarding process illustrated in FIG. 2 includes at least a port lookup operation 200, a virtual local area network (VLAN) lookup operation 205, a port/VLAN lookup operation 210, a bridge lookup operation 215, a firewall session lookup operation 220, a route lookup operation 225, a forward lookup operation 230, an encapsulation operation 235, an encryption operation 240, a tunnel de-capsulation operation 245, a decryption operation 250, and a transmit operation 260.

Packet Ordering Engine (POE)

Packet ordering engine (POE) not only helps to control the order in which the packets are sent out from the disclosed system, but also helps control the order in which the packets are processed inside the system.

In some embodiments, to simplify processing, the system processes packets of the same session in a one CPU to ensure that a session entry is being used and updated by only one CPU at any point of time. This implicitly decides the order in which the packets shall be handled.

On the other hand, packets from two servers destined to the same client can be processed in different CPUs. When these packets need to be encrypted with the same key prior to being transmitted to the client, the packets would have to egress the network device, e.g., a network controller, in the order in which the sequence counter got assigned to each of the packets.

Now, consider two packets from each of two different flows destined to the same client—A1, A2 and B1, B2. As long as packet A2 is forwarded to the network from the disclosed system after packet A1, and packet B2 after packet B1, the order across the two flows has little significance on the network's functionality and/or performance, and thus giving the disclosed system flexibility in which the encryption sequence counters are assigned to these packets. The disclosed system only needs to inform the POE about the sequence in which the counters were assigned so that POE can release the packets to the network in the same order in which the counters were assigned.

Given that the ingress CPU assignment of the packets by design ensures the correct ordering within a flow, clear text packets do not require explicit ordering of packets from hardware. The packets need be ordered only when they need to be encrypted by SAE, because there is a possibility for packet reordering in the security engine SAE as well as in the ingress CPU that assigns the packet counter and sets up the packet for encryption.

In one embodiment, Security Acceleration Engine (SAE) comprises multiple identical units (e.g. up to 12 identical units) to which the packets are allocated to in a round robin fashion. For a given cipher, encryption time for a packet may be dependent on the size of the packet. Hence, a small packet arriving at SAE after a large packet can be sent back out-of-order after encryption from SAE.

When an attempt to send a message fails, the message gets retried from a virtual output queue in every CPU. Based on the credit availability, the packets can be temporarily stuck in these virtual output queues for a short period of time. Moreover, when packets get setup for encryption from different ingress CPUs, based on the credit availability, message to SAE can be sent out of order compared to the order in which the counters were assigned to the packet.

To avoid packet ordering issues under these circumstances, POE can be setup with the ordering in which it should be transmitted when the counters are assigned to the packet. Thus after encryption, when the POE receives the packet out-of-order from the SAE, either due to the spraying in SAE or due to other reasons, POE can wait for the packet in the head to arrive, prior to transmitting the packets that are encrypted and are ready for transmission. Specifically, as an illustrative example, a POE can queue up to 64K packets at a time across 64K queues. Up to 6K of the packets can be in an on-chip memory, and additional packets will be stored into memory.

POE Identifies a Packet Based on Two Tuples
   A multi-bit POE buffer address (e.g., 16-bit address) that identifies the packet in the POE memory. This value is completely managed by POE;
   A multi-bit flow identifier (e.g. 16-bit flow identifier) that identifies the queue in which the packet resides. This is managed by software through hardware configuration and queue identifier management.

Flow Identifier Assignment can be Done in Two Ways
   1. When the packet passes the NAE, a multi-byte key (e.g. 40-byte key) based on the content of the packet can be generated. By programming a base value, mask and a configurable polynomial, POE can be made to generate a flow identifier within a specific range.
   2. After the packet has been received by the main CPUs, it can send it to re-queue the packet to a new flow id assigned by the main CPU by providing the old flow id. It can also be done by sending a en-queue message with a new flow identifier.

While the POE buffer in sending packets out of the CPU in the same order in which it was received, when allowing the packet to be processed in parallel in CPU or any other subsystem in the SMP architecture.

Packet ordering engine (POE) in the SMP architecture provides hardware support to ensure transmission of packet in the order in which it was received based on a flow identifier. Particularly, multi-core multi-thread processor variants in the disclosed system can support a plurality of flow identifiers (e.g. up to 64K flow identifiers), where only some of these flow identifiers, normally less than one-quarter of the flow identifiers (e.g. 6K flow identifiers) can be stored on the chip and the rest in the memory. The flow identifier for a queued packet can be determined in multiple ways.
   1. It can be determined on ingress, based on a hash of the key generated for the packet by the hardware parser and the micro-core engine.
   2. After the packet is received by the CPU, it can allocate a new flow identifier and re-enqueue the packet to the new flow identifier with an FMN message.
   3. Packet can be sent to CPU with no flow identifier, and then the CPU can decide whether to order the packet, for which it can send a FMN message to POE with an enqueue command.

Packet ordering is done based on two entities—(1) a flow identifier (e.g. 16 bit identifier); and, (2) a buffer handle (e.g., 16 bit handle). The buffer handle is used to identify a specific packet stored at a certain location. The actual address or the content of the packet is not used by the POE. POE generally maintains multiple queues of packet handles based on their corresponding flow identifiers. Once the flow identifier and the buffer handle is assigned, POE can control the order in which the packets are processed.

Security Acceleration Engine (SAE)

Security Acceleration Engine (SAE) is capable of supporting up to 40 Gbps of throughput. It supports all of the WLAN-ciphers, such as, Advanced Encryption Standard Counter with Cipher Block Chaining-Message Authentication Code (AESCCM), Advanced Encryption Standard Counter with Galois/Counter Mode (AESGCM) and Rivest Cipher 4 (RC4), along with other IPSec crypto ciphers, such as, Triple Data Encryption Standard (3DES).

In a general ciphering process, a security key typically includes two parts: a static key and a counter, which can be 32-bit, 64-bit, or 128-bit based on different ciphering algorithms. The key may be negotiated by any security protocol, such as, IKE. IEEE 802.1x, etc. The counter increments for each packet. Thus, no same key is used to encrypt two packets because of the packet counter increment. As an example, when a packet is transmitted from device A to device B, the counter portion is carried in clear text in the packet. Further, the key is already negotiated; and thus, both device A and device B have knowledge of the pre-negotiated key.

Note that, the counter is used for protecting against replay attacks. Thus, the system must ensure that the counter values in the packets are in increasing order. Nevertheless, if device A and device B communicates in layer 3 or layer 4it is possible that the packets are received in different ordering, because different packets may be transmitted via different routes. In addition, each security protocol typically defines an acceptance window. For example, for IPSec, size of the acceptance window is defined as 64. Thus, for any received packet, the system will accept the packet if the difference between the counter in the packet and the counter in a previously received packet causing a first known gap in the counter sequence is within the protocol-defined acceptance window. Otherwise, if the difference the counters are greater than the size of the acceptance window, the received packet will be discarded. By contrast, for IEEE 802.11 packets, L2 encryption is used in one-hop communications, for example, between an access point and a client. Thus, the acceptance window size is 1. Therefore, if any packet from a flow is received out of order, the packet will be discarded.

Also, SAE supports Advanced Encryption Standard in Counter with CBC-MAC mode (AES-CCM) in a single pass and provides 40 Gbps of raw throughput. As mentioned earlier, SAE throughput is independent of the CPU clock frequency. The descriptor format for SAE in SMP architecture supports byte alignment for all address and length fields to allow for use without restriction under various circumstances like WLAN-fragmentation and Aggregated MAC Service Date Unit (AMSDU).

Furthermore, when a descriptor is sent to SAE for encryption or decryption, the return message generally is set to be received by a CPU with a cookie that was sent in the original request for software use. SAE allows specifying any feedback message and allows sending the response back to any subsystem in the chipset. It could be set to return the packet to the POE engine to serialize the packet and send it for transmission. The return descriptor format can be set to contain the encrypted packet along with the flow identifier and the POE handle to send the packet for transmission.

SAE internally is composed of multiple engines (e.g. 12 engines), which have corresponding security pipes (e.g. 12 security pipes) each with a capacity of approximately 4 Gbps for example. There are multiple Virtual Channels (VCs), such as 16 virtual channels for example, which schedule the descriptors for cipher operations. SAE Engine select registers allows these channels to send descriptors to one or more of the Security Pipes. A majority of the virtual channels may be low priority virtual channels while the remainder are high priority virtual channels. As an illustrative embodiment, out of 16 virtual channels, 12 channels are low priority channels and the virtual channels 12 through 15 are high priority VCs. Messages in high priority VCs are scheduled for operations before any of the messages in 12 low priorities and sent to the security pipes.

Out-of-Order Packets from Multiple Flows

Figure 3:
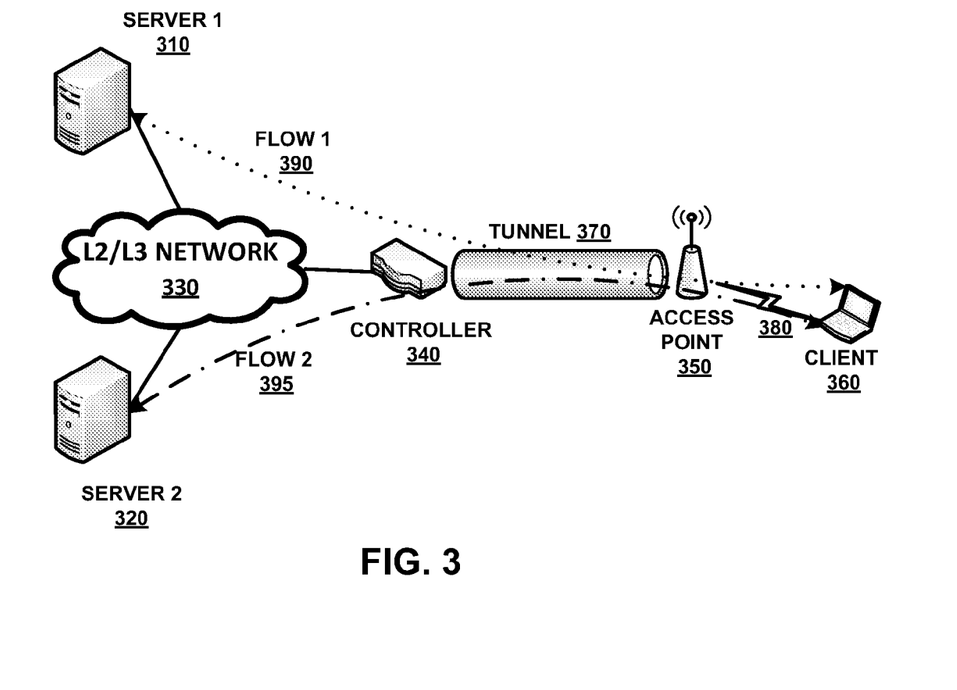
FIG. 3 is a diagram illustrating exemplary use case scenario where out-of-order packets from multiple flows are supported according to embodiments of the present disclosure.

FIG. 3 is a diagram illustrating exemplary use case scenario where out-of-order packets from multiple flows are supported. FIG. 3 includes at least server 1 310, server 2 320, controller 340, access point 350, and client 360. Specifically, server 1 310 and server 2 320 are connected to controller 340 through L2/L3 network 330. Moreover, controller 340 and access point 350 are connected via a secure tunnel 370, e.g., a GRE tunnel; and, client 360 is associated with access point 350 via wireless link 380. Furthermore, for illustration purposes only, assuming that client 360 is concurrently receiving two different flows, e.g., flow 1 390 from server 1 310 and flow 2 395 from server 2 320. Packets from both flows are transmitted through the same tunnel, e.g., tunnel 370.

Moreover, packets from different flows, such as flow 1 390 and flow 2 395, can be processed by different CPU processing cores. However, packets from both flows need to be encrypted using the same Security Association (SA). Therefore, once each packet is assigned a SA sequence number, the system needs to ensure that the packets are transmitted out in the order of the assigned SA sequence number.

One solution for ensuring the order of the SA sequence number is to use an atomic counter for the sequence number. The atomic counter is uniquely associated with the SA. Thus, the atomic counter provides way of providing consistent counters in an SMP architecture by serially incrementing the SA sequence number value.

It is an important goal that the order in which the packets are sent to the counter shall be the same as the order in which the packets are sent by the POE to the SAE. Thus, an alternative and enhanced way of achieving the above goal is for SAE to use the POE's assistance to perform the reordering of the packets.

Figure 4:
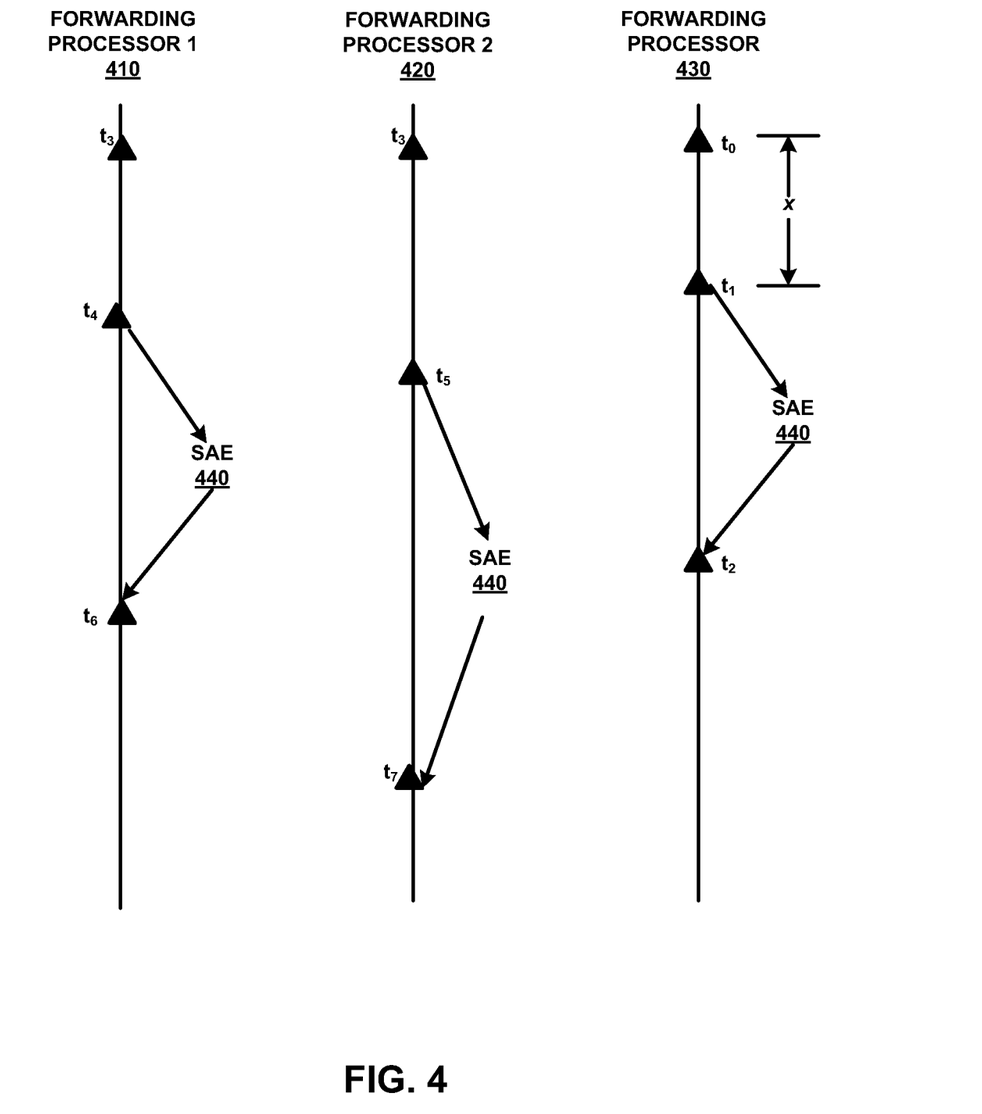
FIG. 4 is a sequence diagram illustrating exemplary use case scenarios where packets may be out of ordering according to embodiments of the present disclosure.

FIG. 4 is a sequence diagram illustrating exemplary use case scenarios where packets may be out of ordering. FIG. 4 includes a generic forwarding processor 430, such as a fast-path (FP) processor. Typically, forwarding processor 430 assigns a counter at time point $t_0$. Then, forwarding processor 430 takes a period of time x for performing encryption setup. At time point $t_1$, forwarding processor 430 sends the packet to SAE. Once the packet is sent to SAE, the packet may be returned to forwarding processor 430 at any random time point $t_2$, e.g., based on what the SAE load is, how many packets are being processed by the system, etc.

Now, assuming that forwarding processor 1 410 and forwarding processor 2 420 both perform the operations that a generic forwarding process 430 does as described above. Furthermore, assuming that both a first packet from flow 1 is received by forwarding processor 1 410 and a second packet from flow 2 is received by forwarding processor 2 420 at the same time point $t_3$. Both flow 1 and flow 2 are associated with the same client and thus same SA. The second packet, however, gets immediately assigned a first sequence number by the counter CPU at time point $t_3$. On the other hand, the first packet gets assigned a second sequence number by the counter CPU at a later time point $t_4$. Thus, the second sequence number assigned to the first packet is greater than the first sequence number assigned to the second packet in this case.

Moreover, forwarding processor 1 410 sends the first packet to SAE 440 for encryption at time point $t_4$; and, the encrypted first packet is subsequently received by forwarding processor 1 at time point $t_6$. By contrast, forwarding processor 2 420 sends the second packet to SAE 440 at time point $t_6$, which is later than time point $t_4$. The encrypted second packet is later received by forwarding processor 2 420 at time point $t_7$, which is later than time point $t_6$ at which the first packet is returned to forwarding processor 1 410. Thus, although the second sequence number assigned to the first packet is greater than the first sequence number assigned to the second packet here, the first packet is received from SAE 440 earlier than the second packet. Therefore, there is no guarantee that a packet with an earlier assigned sequence number would be returned by SAE earlier, and thus in the order of the sequence number.

Hence, SAE 440 may produce packets that are out of ordering as illustrated in FIG. 4. A number of reasons may lead to reordering of the packets, for example, various CPU processing times by different forwarding processors, various SAE processing time due to different natures of the packets, various delays in different queues in the system, the encryption setup process at various forwarding processors may experience delays, etc.

Figure 5:
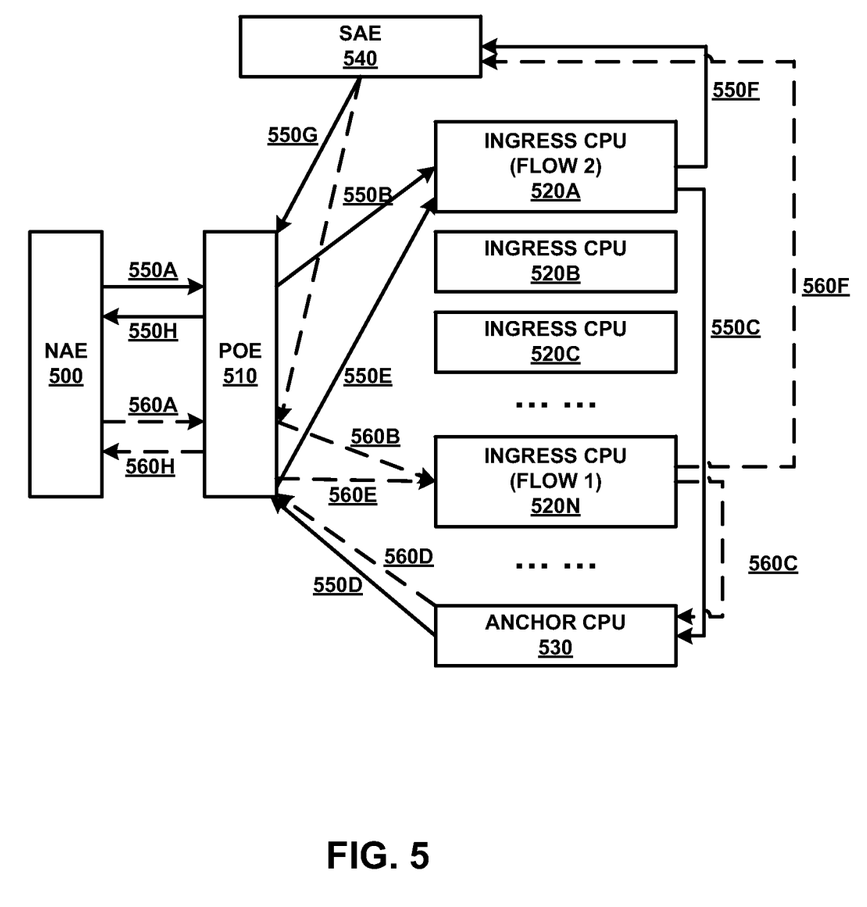
FIG. 5 is a diagram illustrating an exemplary processing of packets from different flows where security engine may have returned packets out of order according to embodiments of the present disclosure.

FIG. 5 is a diagram illustrating an exemplary processing of packets from different flows where SAE may have returned the packets out of order. In particular, FIG. 5 includes a NAE 500, a POE 510, a SAE 540, a plurality of ingress CPUs 520A-520N, and an anchor CPU 530. For illustration purposes only, assuming that a first packet from flow 2 is received by NAE 500. The first packet is then forwarded from NAE 500 to POE 510 (operation 550A). POE 510 assigns a sequence number to the packet based on its flow identifier, and forwards the first packet to the corresponding ingress CPU 520A that is designated for processing flow 2 (operation 550B). Next, ingress CPU 520A sends the first packet to anchor CPU 530 (operation 550C), which uses an atomic counter to assign a POE sequence number and returns the first packet to POE (operation 550D). The first packet having assigned a POE sequence number is then sent by POE 510 to ingress CPU 520A for further processing (operation 550E). Upon receiving the first packet, ingress CPU 520A forwards the first packet to SAE 540 for encryption (operation 550F). SAE 540 encrypts the first packet and send the encrypted packet back to POE 510 (operation 550G). Subsequently, POE 510 sends the processed packet to NAE 500 (operation 550H). If POE 510 detects that packets are received from SAE 540 out of order, POE will wait for the missing packets with earlier assigned sequence numbers to be returned from SAE 540 prior to sending out received packets with later assigned sequence numbers.

Likewise, for flow 1, a second packet from is received by NAE 500. The second packet is then forwarded from NAE 500 to POE 510 (operation 560A). POE 510 assigns a sequence number to the second packet based on its flow identifier, and forwards the second packet to the corresponding ingress CPU 520A that is designated for processing flow 1 (operation 560B). Next, ingress CPU 520A sends the second packet to anchor CPU 530 (operation 560C), which uses an atomic counter to assign a POE sequence number and returns the second packet to POE (operation 560D). The second packet having assigned a POE sequence number is then sent by POE 510 to ingress CPU 520A for further processing (operation 560E). Upon receiving the second packet, ingress CPU 520A forwards the second packet to SAE 540 for encryption (operation 560F). SAE 540 encrypts the second packet and send the encrypted packet back to POE 510 (operation 560G). Subsequently, POE 510 ensures that packets in flow 1 are in correct order and sends the processed packet to NAE 500 (operation 560H). If POE 510 detects that packets are received from SAE 540 out of order, POE will wait for the missing packets with earlier assigned sequence numbers to be returned from SAE 540 prior to sending out received packets with later assigned sequence numbers.

In particular, note that with the solution described herein, the disclosed system designates one forwarding CPU as an anchor CPU for a specific security association (SA), where the anchor CPU is configured for handling serialization through assignment of sequence numbers. Note that, the anchor CPU can be different from the designated ingress CPU. Also, multiple ingress CPUs may be designated to the same anchor CPU. Because it is common for one anchor CPU to serve multiple ingress CPUs, it is desirable to assign the anchor CPU minimal amount of work in order to achieve high system performance. Also, it is contemplated that a hardware engine, such as POE, would handle the serialization without the need of the anchor CPU.

Accordingly, for the anchor CPU to work effectively with the POE to ensure correct packet ordering across multiple flows associated with the same SA, at least two things need to happen atomically. First, the assignment of POE sequence number needs to be atomic. Second, the anchor CPU shall inform the POE of the flow identifier and the buffer.

Note that, besides executing the above operations at the anchor CPU, the above two operations can be alternatively executed as a critical section at the ingress CPU without involvement of the anchor CPU. A "critical section" is a SMP technique, which generally means that no two CPUs execute the same code. More specifically, the process of a critical section involves obtaining a lock, executing pieces of code, and releasing the lock.

Assuming that each SA corresponds to a specific POE flow identifier, because each end-to-end connection between a client and a server represents a layer 4 flow, when one client has two concurrent connections to two different servers and thus corresponds to two different layer 4 flows, the disclosed system will designate a single POE flow identifier to both layer 4 flows sharing the same SA. Note that, whenever a new SA is created, upon completion of authentication key negotiation (e.g., completion of IEEE 802.1x transaction), the disclosed system will assign a POE flow identifier to the SA.

When a packet is received by NAE 500, the packet is forwarded from NAE 500 to POE 510, POE 510 forwards the packet to its designated ingress CPU without any modification based on the flow identifier associated with the packet. Thus, a first packet from flow 1 will be forwarded to ingress CPU 520N; and, a second packet from flow 2 will be forwarded to ingress CPU 520A. When the packet is received by the ingress CPU, the ingress CPU will go through the forwarding pipeline process as described in FIG. 2. Moreover, the ingress CPU knows which key shall be used to encrypt the packet by first determining the destination, e.g., a client's IP or MAC address associated with the packet. Then, based on the destination, the ingress CPU can determine which SA the packet is associated with. Thus, the ingress CPU can further determine, based on the SA, which flow the packet belongs to.

Because each SA corresponds to a specific anchor CPU, in the message sent from ingress CPU (e.g., ingress CPU 520A or ingress CPU 520N) to anchor CPU 530, the disclosed system will include, but are not limited to, the SA, the POE flow identifier, and a packet descriptor. In one embodiment, the packet descriptor includes a start address of the buffer. Moreover, the POE flow identifiers are stored in the queue.

Next, upon receiving the packet from ingress CPU (e.g., ingress CPU 520A or ingress CPU 520N), anchor CPU 530 increments its counter. Note that, the increment of the counter by anchor CPU 530 does not need to be an atomic operation, because there is only one anchor CPU assigned for each POE flow. Thus, in the example illustrated in FIG. 5, packets from both flow 1 and flow 2 will be sent to the same anchor CPU 530 corresponding to the same POE flow identifier, despite that they may be sent from two different ingress CPUs corresponding to two different layer 4 flows. The need for atomic operation is eliminated because there is a single anchor CPU 530 that can process only one packet at a time regardless of which layer 4 flow that the packet belongs to.

Subsequently, anchor CPU 530 sends the packet to POE 510 with the POE flow identifier and the response message that is set up to be sent to the original ingress CPU (e.g., ingress CPU 520A or 520N). Specifically, the response message includes, but is not limited to, a counter (e.g., POE sequence number), SA information, and a packet descriptor. Because anchor CPU 530 is configured to perform only two operations, anchor CPU 530 can perform its functions very efficiently. Note that, POE 510 is not engaged in the assignment of any flow identifier.

When POE 510 receives the packet, POE performs an enqueue operation on the packet based on the flow identifier, and assigns (flow id, POE addr) to the packet. The POE address generally refers to one of the 64K slots that the disclosed system maintains.

Figure 6A:
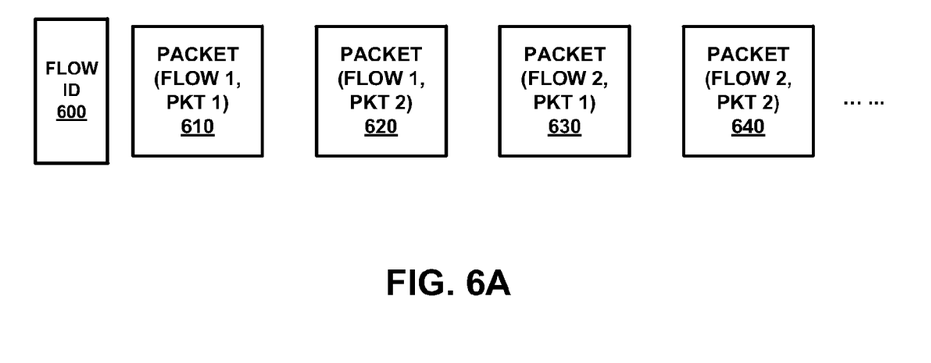
FIG. 6A-6B illustrate various ways that anchor CPU assigns flow identifiers to packets from multiple flows according to embodiments of the present disclosure.

FIG. 6A-6B illustrate various ways that anchor CPU assigns flow identifiers to packets from multiple flows according to embodiments of the present disclosure. In the example illustrated in FIG. 6A, the POE queue begins with flow ID 600 which corresponds to a unique POE flow. Assuming that two packets, e.g., packet 1 and packet 2, have been received from each of the two layer 4 flows, e.g., flow 1 and flow 2, the packets will be ordered in the queue based on their POE sequence number assigned by anchor CPU. Here, packet 610 corresponds to packet 1 from flow 1, which is followed by packet 620 corresponding to packet 2 from flow 1, which is followed by packet 630 corresponding to packet 1 from flow 2, which is followed by packet 640 corresponding to packet 2 from flow 2, etc.

Figure 6B:
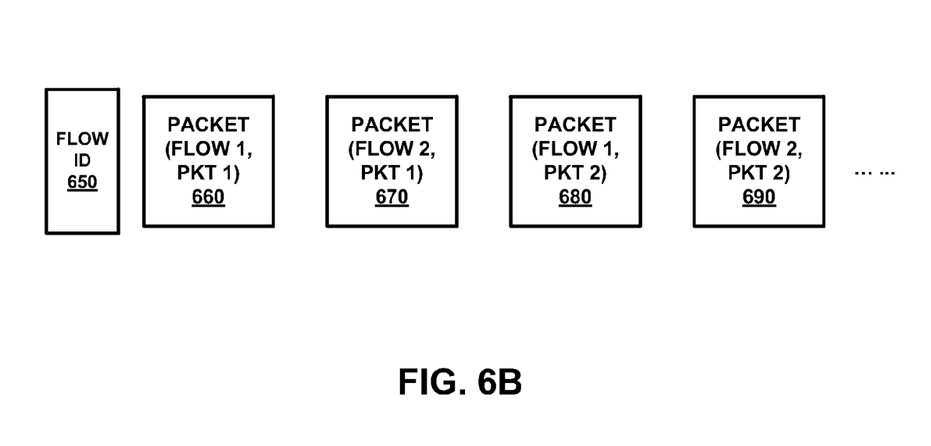

FIG. 6B illustrates an alternative packet ordering of multiple packets received from multiple layer 4 flows. In this example, the POE queue begins with flow ID 650 which corresponds to a unique POE flow. Next, packet 660 corresponds to packet 1 from flow 1, which is followed by packet 670 corresponding to packet 1 from flow 2, which is followed by packet 680 corresponding to packet 2 from flow 1, which is followed by packet 690 corresponding to packet 2 from flow 2, etc.

Note that, other orderings of the packets may exist as long as the packets within the same layer 4 flow are in incrementing orders in the queue of the POE flow. In other words, the disclosed system allows any kind of reordering of the packets between different layer 4 flows. However, the ordering of the packets within each layer 4 flows is the same in the POE queue. In some embodiments, POE address generally refers to a link list address. Thus, (flow id, POE addr) corresponds to an element in a queue as illustrated in FIGS. 6A-6B. Further, (flow id, POE addr) is associated with flow id, and an address inside the queue, e.g., POE addr which can be a link list address, POE queues the packets in the ordering in which the packets are received from anchor CPU. Then, POE sends the packets to their respective ingress CPUs, which send the packets to SAE for encryption. Upon completion of the encryption operation, SAE will return the packets to POE. POE will compare the returned packet with the head of the POE queue, and determine whether the returned packet is identical to the head of the POE queue. Note that, SAE will mark the status of the packet as being ready for transmission after SAE encrypts the packet. The disclosed system can transmit the processed packet to the network anytime when the packet is marked as ready for transmission if the packet is identical to the head of the queue. After a packet returned from SAE to POE is transmitted out to the network via NAE, POE will remove the packet from the queue that it maintains such that the head of the POE queue is associated with the packet with the next POE sequence number. If, however, the packet received by POE from SAE is not the head of the queue, then POE will queue the packet until it receives the processed packet (which is marked as "ready") that matches the head of the POE queue.

In some embodiments, to further enhance the capacity of the disclosed system, multiple security associations (SAs) can correspond to the same POE flow, while multiple layer 4 flows may correspond to each SA. Thus, in these embodiments, each element of the POE queue may be represented as (flow id, SA info, POE addr).

Figure 7:
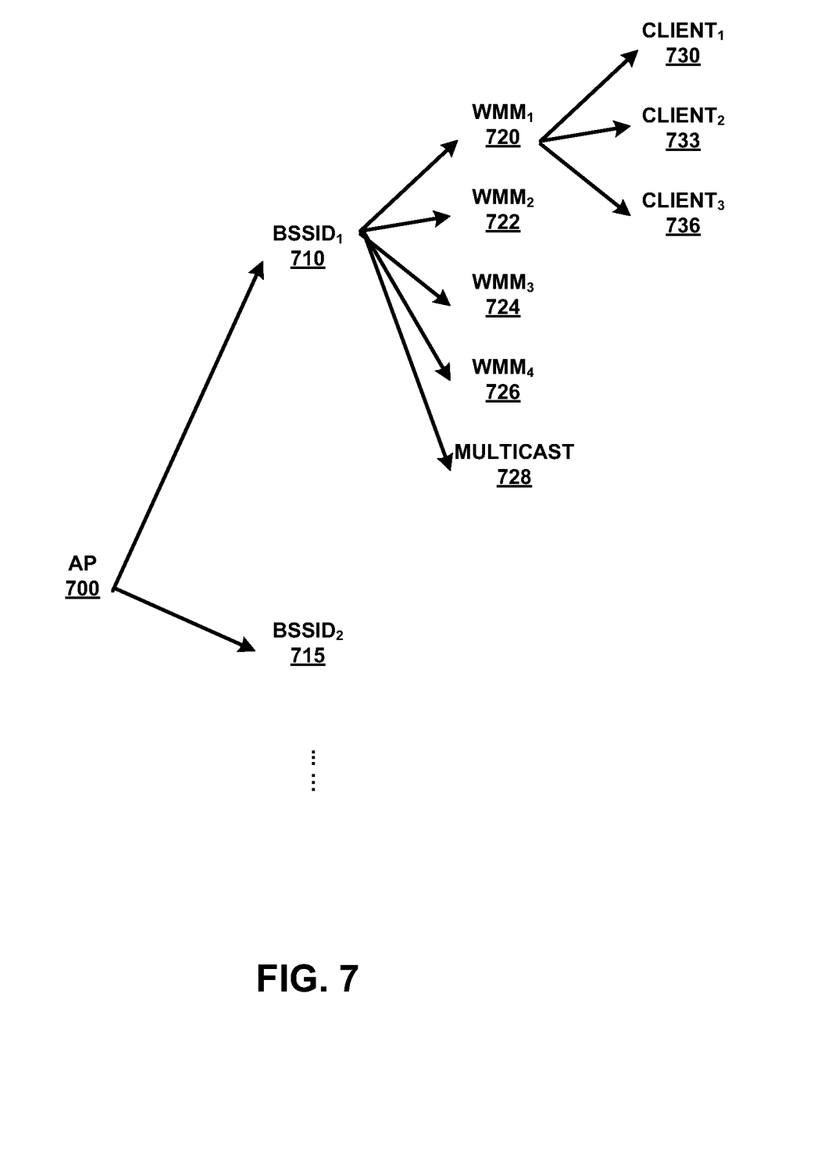
FIG. 7 is a diagram illustrating different levels of POE queue mapping according to embodiments of the present disclosure.

FIG. 7 illustrates different levels of POE queue mapping according to embodiments of the present disclosure. As illustrated in FIG. 7, in a typical WLAN, AP 700 broadcasts multiple Basic Service Set Identifiers (BSSIDs), such as $BSSID_1$ 710 and $BSSID_2$ 715. Moreover, each BSSID maintains multiple priority queues, e.g., $BSSID_1$ 710 maintains $WMM_1$ 720, $WMM_2$ 722, $WMM_3$ 724, $WMM_4$ 726, as well as a multicast queue 728. The same WMM mapping applies to all clients that are associated with the given BSSID broadcasted by AP 700. Furthermore, each WMM queue corresponds to multiple clients, e.g., $client_1$ 730, $client_2$ 733, $client_3$ 736 are all associated with $WMM_1$ 720 in the illustrated example. Hence, depending on preferences and needs of the network, the disclosed system can assign a POE queue on a per-client basis (e.g., a unique POE queue for each client), on a per-WMM basis (e.g., a unique POE queue for each WMM unicast queue or multicast queue), on a per-BSSID basis (e.g., a unique POE queue for each BSSID), etc.

Processes for Enhanced Serialization Mechanism

Figure 8:
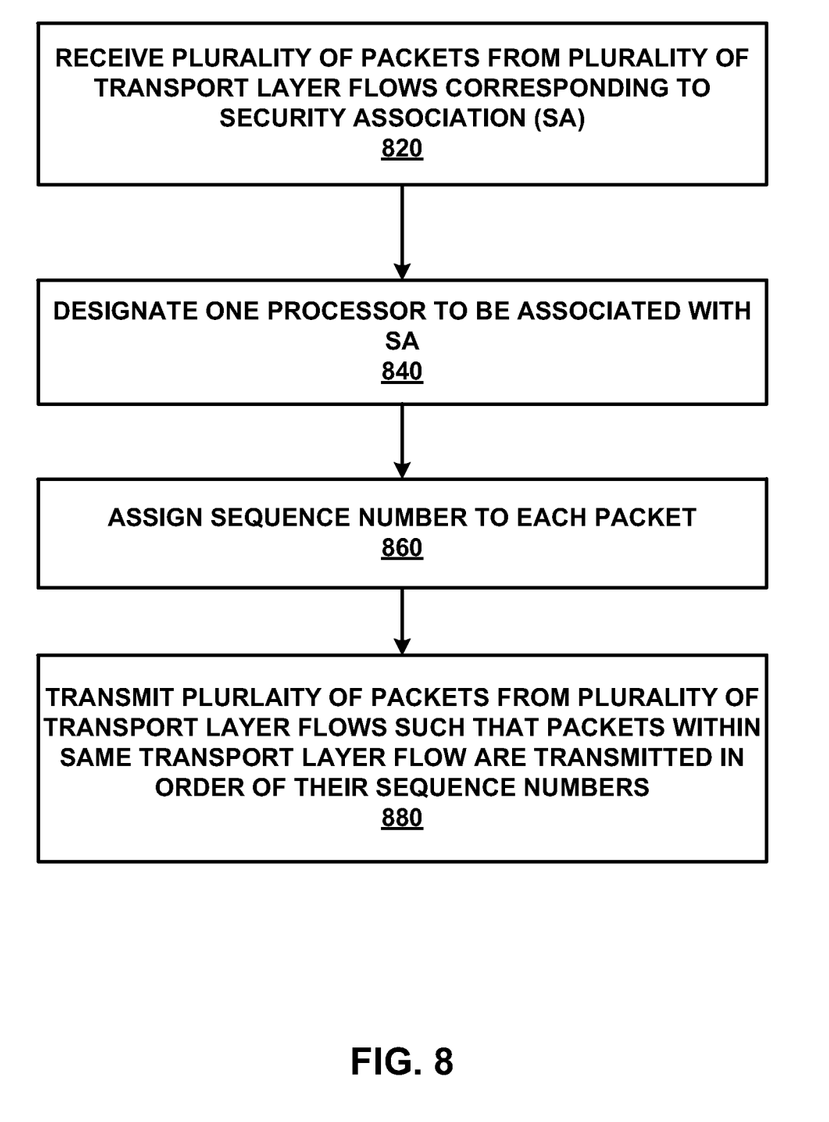
FIG. 8 is a flowchart illustrating exemplary processes for enhanced serialization mechanism according to embodiments of the present disclosure.

FIG. 8 is a flowchart illustrating exemplary processes for enhanced serialization mechanism. During operation, the disclosed system receives a plurality of packets from a plurality of transport layer flows corresponding to a security association (SA) (operation 820). Also, the disclosed system designates one processor to be associated with the SA (operation 840). Specifically, the designated one processor receives the plurality of packets from a plurality of ingress processors; and, each transport layer flow corresponds to a respective ingress processor. A respective ingress CPU also forwards to the designated one processor information of the security association, and an internal flow identifier besides the packet.

Furthermore, the disclosed system assigns a sequence number to each packet (operation 860). In some embodiments, assigning the sequence number is performed by the designated one processor. In other embodiments, assigning the sequence number is executed as a critical section by a respective ingress processor among the plurality of processors. The critical section ensures that no two processors in the disclosed system will execute the code section simultaneously.

The designated one processor will then forward the packet with assigned sequence number to a packet ordering module. Subsequently, the packet ordering module queues the plurality of packets by the assigned sequence number of each packet in a queue, and sends the plurality of packets to a security processing module for encryption. When the packet ordering module receives a processed packet from the security processing module, the packet ordering module determines whether the processed packet corresponds to a head element of the queue. If so, the disclosed system transmits the processed packet and removes the head element from the queue. Otherwise, the disclosed system delays the transmission of the processed packet until the processed packet corresponds to the head element of the queue. Accordingly, the disclosed system transmits the plurality of packets from the plurality of transport layer flows such that packets within the same transport layer flow are transmitted in order of their sequence numbers (operation 880).

It is important to note that, two packets from two different transport layer flows may be transmitted out of incremental order of their sequence number. Also, note that, the plurality of packets may correspond to a queue that is uniquely identified by any one of a security association, a priority queue, and a basic service identifier (BSSID).

System for Enhanced Serialization Mechanism

Figure 9:
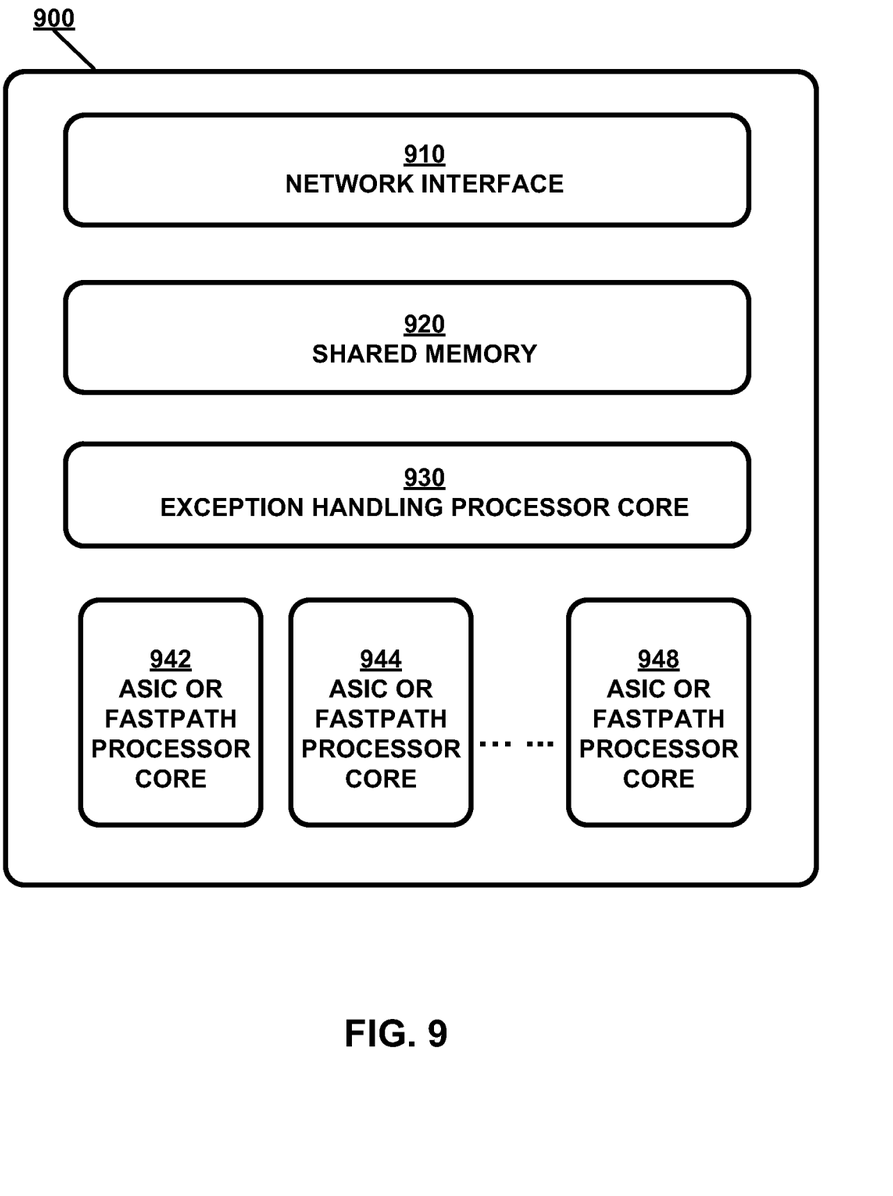
FIG. 9 is a block diagram illustrating an exemplary system for enhanced serialization mechanism according to embodiments of the present disclosure.

FIG. 9 is a block diagram illustrating a network device system control plane protection for various tables using storm prevention entries according to embodiments of the present disclosure. Network device 900 includes at least a network interface 910 capable of communicating to a wired network, a shared memory 920 capable of storing data, a slowpath processor core 930 capable of processing network data packets, and one or more ASICs or fastpath processor cores, including ASIC/fastpath processor core 942, ASIC/fastpath processor core 644, . . . , ASIC/fastpath processor core 948, which are capable of processing network data packets. Moreover, network device 900 may be used as a network switch, network router, network controller, network server, etc. Further network device 900 may serve as a node in a distributed or a cloud computing environment.

Network interface 910 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 610 may be software-defined and programmable, for example, via an Application Programming Interface (API), and thus allowing for remote control of the network device 600.

Shared memory 920 can include storage components, such as, Dynamic Random Access Memory (DRAM), Static Random Access Memory (SRAM), etc. In some embodiments, shared memory 920 is a flat structure that is shared by all datapath processors (including, e.g., exception handling processor core 930, ASIC/fastpath processor core 942, ASIC/fastpath processor core 944, . . . , ASIC/fastpath processor core 948, etc.), and not tied to any particular CPU or CPU cores. Any datapath processor can read any memory location within shared memory 920. Shared memory 920 can be used to store various tables, lists and/or POE queues to facilitate enhanced serialization mechanism described herein. For example, the tables may include, but are not limited to, a bridge table, a session table, a user table, a station table, a tunnel table, a route table and/or route cache, etc. It is important to note that any datapath processor can have access to any location in lockless shared memory in network device 900.

Exception handling processor core 930 typically includes a networking processor core that is capable of processing network data traffic. Exception handling processor core 930 is a single designated CPU core per ASIC/fastpast CPU core that typically handles table managements and exceptions, such as missed entry in the tables. Note that, exception handling processor core 930 only receives data packets from one or more ASIC/fastpath processor cores, such as ASIC/fastpath processor core 942, ASIC/fastpath processor core 944, . . . , ASIC/fastpath processor core 948. In other words, exception handling processor core 930 does not receive data packets directly from any line cards or network interfaces. Only the plurality of fastpath processor cores can send data packets to exception handling processor core 930. Moreover, exception handling processor core 930 is the only processor core having the write access to entries in the tables stored within shared memory 920, and thereby will not cause any data integrity issues even without a locking mechanism in place for shared memory 920.

ASICs/fastpath processor cores 942-948 also include networking processor cores that are capable of processing network data traffic. However, by definition, ASICs/fastpath processor cores 942-948 only performs "fast" packet processing. Thus, ASICs/fastpath processor cores 942-948 do not block themselves and wait for other components or modules during the processing of network packets. Any packets requiring special handling or wait by a processor core will be handed over by ASIC/fastpath processor cores 942-948 to exception handling processor core 930.

Each of ASIC/fastpath processor cores 942-948 maintains one or more counters. The counters are defined as a regular data type, for example, unsigned integer, unsigned long, etc., in lieu of an atomic data type. When an ASIC/fastpath processor core 942-948 receives a packet, it may increment or decrement the values of the counters to reflect network traffic information, including but not limited to, the number of received frames, the number of received bytes, error conditions and/or error counts, etc. A typical pipeline process at ASIC/fastpath processor cores 942-948 includes one or more of: port lookup; VLAN lookup; port-VLAN table lookup; bridge table lookup; firewall session table lookup; route table lookup; packet encapsulation; packet encryption; packet decryption; tunnel de-capsulation; forwarding; etc.

According to embodiments of the present disclosure, network services provided by network device 900, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
    receiving, by a network device, a plurality of packets from a plurality of transport layer flows corresponding to a security association;
    designating, by the network device, one processor of a plurality of processors to be associated with the security association;
    forwarding, by a respective ingress CPU, each packet, information of the security association, and internal flow identifiers associated with each packet to the designated one processor;
    assigning, by the network device, a sequence number to each packet of the plurality of packets based on a flow identifier associated with each packet and a buffer handle associated with (1) each packet and (2) the location of the respective packets in memory; and
    transmitting, by the network device, the plurality of packets from the plurality of transport layer flows such that packets within the same transport layer flow are transmitted in order of their sequence numbers.

2. The method of claim 1, wherein at least two packets from two different transport layer flows are transmitted out of incremental order of their sequence number.

3. The method of claim 2, wherein the at least two packets are transmitted out of order of their sequence number subsequent to one or more of:
    variations in processing times by the plurality of processors;
    variations in security processing time based on different characteristics of different packets;
    variations in delays associated with different queues; and
    various delays experienced in an encryption setup process at the plurality of processors.

4. The method of claim 1, wherein assigning the sequence number is performed by the designated one processor.

5. The method of claim 4, wherein each transport layer flow corresponds to a respective ingress processor.

6. The method of claim 1, wherein assigning the sequence number is executed as a critical section by a respective ingress processor among the plurality of processors.

7. The method of claim 1, wherein a packet ordering module receives the plurality of packets from the designated one processor with assigned sequence number, the method further comprising the packet ordering module:
    queuing the plurality of packets by the assigned sequence number of each packet in a queue; and
    sending the plurality of packets to a security processing module for encryption.

8. The method of claim 7, further comprising the packet ordering module:
    receiving a processed packet from the security processing module;
    determining whether the processed packet corresponds to a head element of the queue;
    in response to the processed packet corresponding to the head element of the queue, transmitting the processed packet and removing the head element from the queue; and
    in response to the processed packet not corresponding to the head element of the queue, delaying transmission of the processed packet until the processed packet corresponds to the head element of the queue.

9. The method of claim 1, wherein the plurality of packets corresponds to a queue that is uniquely identified by one of: a security association, a priority queue, and a basic service identifier.

10. A network device having a symmetric multiprocessing architecture, the network device comprising:
    a plurality of CPU cores;
    a network interface to receive one or more data packets; and
    a memory whose access is shared by the dedicated CPU core and the plurality of CPU cores;

wherein the plurality of CPU cores are to:
receive a plurality of packets from a plurality of transport layer flows corresponding to a security association;
designate one processor of a plurality of processors to be associated with the security association;
forward, by a respective ingress processor, each packet, information of the security association, and internal flow identifiers associated with each packet to the designated one processor;
assign a sequence number to each packet of the plurality of packets based on a flow identifier associated with each packet and a buffer handle associated with (1) each packet and (2) the location of the respective packet in memory; and
transmit the plurality of packets from the plurality of transport layer flows such that packets within the same transport layer flow are transmitted in order of their sequence numbers.

11. The network device of claim 10, wherein at least two packets from two different transport layer flows are transmitted out of incremental order of their sequence number.

12. The network device of claim 11, wherein the at least two packets are transmitted out of order of their sequence number subsequent to one or more of:
variations in processing times by the plurality of processors;
variations in security processing time based on different characteristics of different packets;
variations in delays associated with different queues; and
various delays experienced in an encryption setup process at the plurality of processors.

13. The network device of claim 10, wherein the designated one processor assigns the sequence number.

14. The network device of claim 13, wherein each transport layer flow corresponds to a respective ingress processor.

15. The network device of claim 10, wherein a respective ingress processor among the plurality of processors assigns the sequence number in a critical section.

16. The network device of claim 10, further comprising a packet ordering module to:
receive the plurality of packets from the designated one processor with assigned sequence number, queue the plurality of packets by the assigned sequence number of each packet in a queue; and
send the plurality of packets to a security processing module for encryption.

17. The network device of claim 16, wherein the packet ordering module further to:
receive a processed packet from the security processing module;
determine whether the processed packet corresponds to a head element of the queue;
transmit the processed packet and remove the head element from the queue in response to the processed packet corresponding to the head element of the queue; and
delay transmission of the processed packet until the processed packet corresponds to the head element of the queue in response to the processed packet corresponding to the head element of the queue.

18. The network device of claim 10, wherein the plurality of packets corresponds to a queue that is uniquely identified by one of: a security association, a priority queue, and a basic service identifier.

19. A non-transitory computer-readable storage medium storing embedded instructions for a plurality of operations that are executed by one or more mechanisms implemented within a network device having a symmetric multiprocessing architecture, the plurality of operations cause the network device to:
process a plurality of received packets from a plurality of transport layer flows corresponding to a security association;
designate one processor of a plurality of processors to be associated with the security association;
forwarding, by a respective ingress CPU, each packet, information of the security association, and internal flow identifiers associated with each packet to the designated one processor;
assign, by the network device, a sequence number to each packet of the plurality of packets based on a flow identifier associated with each packet and a buffer handle associated with (1) each packet and (2) the location of the respective packets in memory; and
transmit the plurality of packets from the plurality of transport layer flows such that packets within the same transport layer flow are transmitted in order of their sequence numbers.

* * * * *